Aug. 18, 1959

C. MATYEAR, JR 2,900,308

SOLVENT EXTRACTION APPARATUS

Filed April 11, 1956

INVENTOR.
C. MATYEAR, JR.

BY *Hudson & Young*

ATTORNEYS

United States Patent Office 2,900,308
Patented Aug. 18, 1959

2,900,308

SOLVENT EXTRACTION APPARATUS

Charles Matyear, Jr., Bartlesville, Okla., assignor to Phillips Petroleum Company, a corporation of Delaware Application April 11, 1956, Serial No. 577,559

8 Claims. (Cl. 196—14.52)

This invention relates to a method of and apparatus for separating fluid mixtures by solvent extraction.

Solvent extraction processes are well known for the separation of fluid mixtures. For example, a mixture of paraffins and aromatic compounds can be separated by contacting the mixture with a selective solvent, such as liquid sulfur dioxide. One particular application of this process is found in the separation of gas oils produced by catalytic cracking operations into separate streams containing predominantly paraffins and aromatic compounds. The paraffins are recycled to the catalytic cracking unit and the aromatic compounds are employed for such purposes as the production of carbon black.

In accordance with the present invention, novel apparatus is provided for carrying out solvent extraction operations. The contacting chamber preferably is in the form of an elongated horizontally disposed cylindrical vessel. A cooling coil is positioned in the lower region of the vessel. The fluid mixture to be separated and a portion of the selective solvent are introduced into the first end of the vessel. The upper region of the vessel is divided into a plurality of regions by spaced vertical baffles. Each baffle has a mixer extending therethrough. Additional portions of the solvent are introduced into the mixture wherein they contact liquid which is passed through the mixers between adjacent regions. The raffinate and extract phases are removed from the second end of the vessel. Means are also provided to direct a heated fluid through the cooling coil periodically to remove waxy deposits that may form on the outer surface of the coil.

Accordingly, it is an object of this invention to provide novel apparatus for use in carrying out solvent extraction operations.

Another object is to provide an improved method of separating paraffins from aromatic compounds.

A further object is to provide a method of and apparatus for removing deposits on cooling coils in solvent extraction apparatus.

Other objects, advantages and features of the invention should become apparent from the following detailed description taken in conjunction with the accompanying drawing in which.

Figure 1:
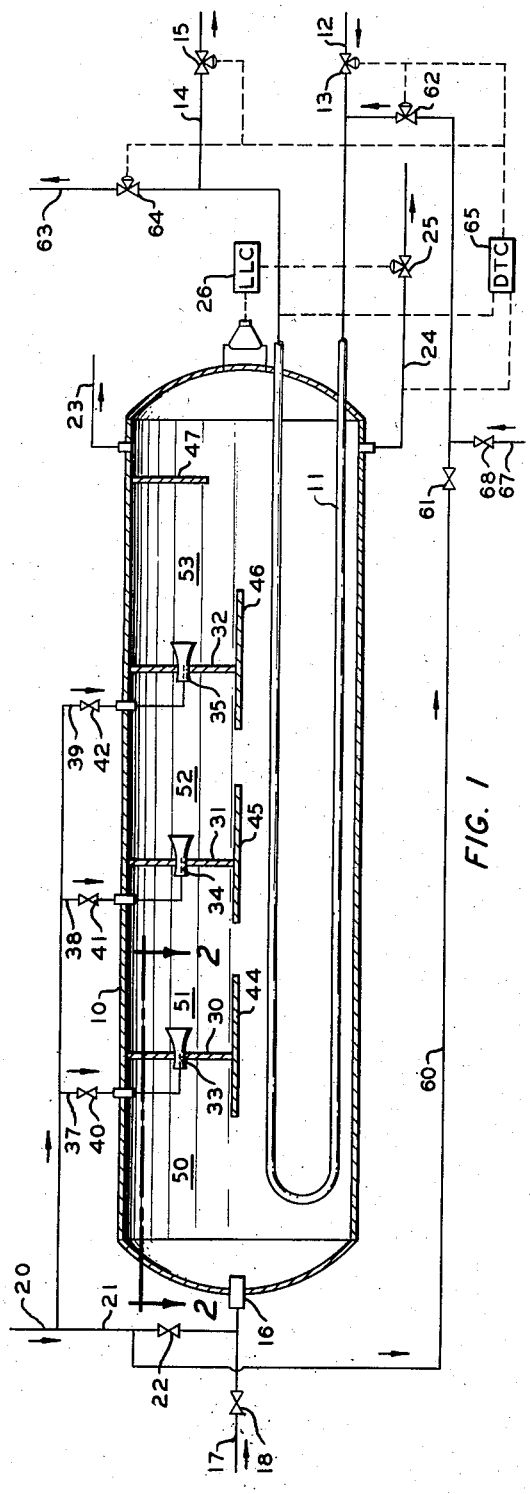
Figure 1 is a schematic view, shown partially in section, of the solvent extraction apparatus of this invention.
Figure 2:
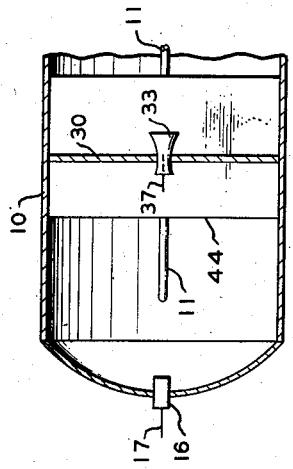
Figure 2 is a sectional view taken along line 2—2 in Figure 1.

Referring now to the drawing in detail, there is shown an elongated horizontally disposed cylindrical contacting vessel 10. A cooling coil 11 is disposed in the lower region of vessel 10. A refrigerant normally is introduced into coil 11 through a conduit 12 which has a control valve 13 therein. The refrigerant normally is removed from coil 11 through a conduit 14 which has a control valve 15 therein. The fluid mixture to be separated is directed to an inlet nozzle 16 by means of a conduit 17 which has a valve 18 therein. The solvent is supplied by means of an inlet conduit 20. A first branch conduit 21, having a valve 22 therein, communicates between conduit 20 and conduit 17. The raffinate phase is removed from the upper region of vessel 10 through an outlet conduit 23. The extraction phase is removed from the lower region of vessel 10 through a conduit 24, which has a control valve 25 therein. Valve 25 is regulated by an interface controller 26 on vessel 10.

A series of vertical baffles 30, 31, and 32 divide the upper region of vessel 10 into a plurality of chambers 50, 51, 52, and 53. Baffles 30, 31, and 32 have respective mixers 33, 34, and 35 extending therethrough. Additional amounts of solvent are introduced into vessel 10 through branch conduits 37, 38, and 39 which extend between conduit 20 and respective mixers 33, 34, and 35. Conduits 37, 38, and 39 have respective valves 40, 41, and 42 therein. Horizontal baffles 44, 45, and 46 are attached to the lower ends of respective vertical baffles 30, 31, and 32. A fourth vertical baffle 47 is positioned near the end of vessel 10 adjacent outlet conduit 23.

The fluid mixture to be separated and a portion of the solvent are introduced into vessel 10 through mixer 16. The resulting extract phase settles to the bottom of vessel 10 where it contacts cooling coil 11. This lowers the temperature of the extraction phase and liberates additional raffinate material which passes from chamber 50 through mixer 33 into chamber 51. This raffinate material is contacted with additional solvent in mixer 33. The resulting extract phase passes downwardly through the opening between baffles 44 and 45. A portion of the original raffinate material which is liberated by coil 11 passes upwardly through this same opening to contact the descending extract phase. The raffinate material in chamber 51 passes through mixer 34 into the third chamber 52. The same process is repeated and raffinate material in chamber 52 passes through mixer 35 into chamber 53. The raffinate is finally removed from vessel 10 through conduit 23. The extract is removed from vessel 10 through conduit 24. Interface controller 26 adjusts valve 25 so that the interface in vessel 10 normally remains slightly below horizontal baffles 44, 45, and 46.

Some hydrocarbon oils have a tendency to deposit a waxy coating on cooling coil 11 which decreases the heat transfer. This coating can be removed by the apparatus of this invention without interrupting the operation of the process. A conduit 60 communicates between conduit 21 and refrigerant inlet conduit 12. Valves 61 and 62 are disposed in conduit 60. A second outlet conduit 63, having a control valve 64 therein, communicates with refrigerant outlet conduit 14. A differential temperature controller 65 is provided to operate control valves 13, 15, 62, and 64. Controller 65 responds to a difference between the temperatures in the extract phase outlet conduit 24 and the refrigerant outlet conduit 14. If a waxy coating begins to deposit on coil 11, the rate of heat transfer between the refrigerant and the extract phase in vessel 10 is diminished. Thus, the refrigerant outlet becomes cooler and the extract phase outlet becomes warmer. When this temperature differential exceeds a predetermined value, controller 65 is energized to close valves 13 and 15 and to open valves 62 and 64. The warmer solvent from conduit 20 is then passed through coil 11 to melt the waxy deposits thereon. When the measured temperature differential falls below a second predetermined value, valves 13 and 15 are opened and valves 62 and 64 are closed. If it is desired to remove the waxy coating at a faster rate, steam can be introduced into coil 11 by means of a conduit 67 which has a valve 68 therein.

As a specific example of the operation of the apparatus of this invention, a mixture of cycle and decant oil from a catalytic cracking unit, having a BMCI (Bureau of Mines Correlation Index) of 48, is introduced into vessel 10 at a rate of approximately 100 barrels per hour. The temperature of this oil is approximately 110°. Liquid sulfur dioxide at a temperature of approximately 70° is supplied to the system through conduit 20. Valves 22, 40, 41, and 42 are adjusted so that the percentages of solvent flow through conduits 21, 37, 38, and 39 are approximately 34, 22, 22, and 22, respectively. Sulfur dioxide at a temperature of approximately 40° F. is circulated through coil 11 to provide cooling in the lower region of vessel 10. This refrigerant is supplied at a rate such that the extract phase removed through conduit 24 represents approximately 40% of the feed, has a BMCI of 80, and is at a temperature of 60° F. The raffinate has a BMCI of 20. Vessel 10 is maintained at a sufficient pressure to keep the solvent in the liquid state. A pressure of 25 pounds per square inch gauge, for example, is adequate for this purpose.

It should be evident that the foregoing example is merely illustrative of the operation of this invention and should not be considered as limiting the invention to these specific conditions. In general, the percentage of solvent supplied to the latter stage mixers should be increased if it is desired to obtain a raffinate phase of higher purity. The desired specific temperatures and pressures employed obviously will vary with the particular materials being separated. The solvent must be one which has a greater specific gravity than the feed mixture being separated. Other solvents which can be employed to advantage when separating hydrocarbon mixtures include phenol and furfural. In some applications, it is desired to eliminate horizontal baffles 44, 45, and 46 entirely. The elimination of these baffles increases the interface contact area. However, the contact area is not so concentrated.

In view of the foregoing description, it should be evident that there is provided in accordance with this invention novel apparatus for use in solvent extraction operations. The apparatus is relatively simple and inexpensive, but still provides intimate contacting between the liquids and solvent. The apparatus can readily be installed and serviced because the vessel is disposed horizontally.

While the invention has been described in conjunction with a present preferred embodiment, it should be evident that it is not limited thereto.

What is claimed is:

1. Solvent extraction apparatus comprising a vessel, cooling means disposed in the lower region of said vessel, an inlet in said vessel through which a fluid mixture to be separated and a solvent can be introduced, a first outlet in the upper region of said vessel spaced from said inlet, a second outlet in the lower region of said vessel spaced from said inlet, a first baffle disposed generally vertically in the upper region of said vessel between said inlet and said first outlet, a mixer extending through said first baffle to permit fluid flow therethrough, a second baffle disposed generally horizontally in said vessel in engagement with the lower edge of said first baffle and extending to regions spaced from the ends of said vessel, and means to introduce solvent through said mixer into the upper region of said vessel on the side of said first baffle adjacent said first outlet.

2. Solvent extraction apparatus comprising an elongated vessel horizontally disposed, cooling means disposed in the lower region of said vessel, an inlet in one end of said vessel through which a fluid mixture to be separated and a solvent can be introduced, a first outlet in the upper region of said vessel adjacent the second end thereof, a second outlet in the lower region of said vessel adjacent said second end, a plurality of baffles vertically disposed in the upper region of said vessel in spaced relationship with one another between said inlet and said first outlet so that the lower regions of said vessel between said baffles are in direct communication, a mixer extending through each of said baffles to permit fluid flow therethrough, first conduit means to introduce solvent, and second conduit means communicating between said first conduit means and each of said mixers to introduce solvent through said mixers in directions toward said first outlet.

3. The combination in accordance with claim 2 further comprising means to detect the interface in said conduit, and means responsive to said means to detect to control the fluid flow through said second outlet to maintain the interface in said vessel at a preselected value.

4. The combination in accordance with claim 2 further comprising a plurality of baffles horizontally disposed in said vessel in engagement with the lower edges of said vertically disposed baffles, respectively, said horizontally disposed baffles being in spaced relationship with one another.

5. Solvent extraction apparatus comprising an elongated vessel horizontally disposed, a cooling coil disposed in the lower region of said vessel, first conduit means communicating with the inlet of said coil to introduce a refrigerant, a first valve in said first conduit means, second conduit means communicating with the inlet of said coil to introduce a heating medium, a second valve in said second conduit means, a fluid inlet in one end of said vessel through which a fluid mixture to be separated and a solvent can be introduced, a first outlet in the upper region of said vessel adjacent the second end thereof, a second outlet in the lower region of said vessel adjacent said second end, a plurality of baffles vertically disposed in the upper region of said vessel in spaced relationship with one another between said fluid inlet and said first outlet, a mixer extending through each of said baffles to permit fluid flow therethrough, means to introduce solvent through said mixers in directions toward said first outlet, means to compare the temperatures at said second outlet and the outlet of said cooling coil, and means responsive to said means to compare to close said first valve and open said second valve when a predetermined temperature differential is detected.

6. Solvent extraction apparatus comprising a liquid-liquid contacting vessel having a fluid inlet, a first fluid outlet in the upper region thereof, and a second fluid outlet in the lower region thereof; a cooling coil in the lower region of said vessel; first conduit means communicating with the inlet of said cooling coil to introduce a refrigerant, a first valve in said first conduit means, second conduit means communicating with the inlet of said coil to introduce a heating medium, a second valve in said second conduit means, means to compare the temperatures at said second outlet and the outlet of said cooling coil, and means responsive to said means to compare to close said first valve and open said second valve when a predetermined temperature differential is detected.

7. Solvent extraction apparatus comprising an elongated vessel horizontally disposed, cooling means disposed in the lower region of said vessel, an inlet in one end of said vessel, a nozzle in said inlet, first conduit means communicating with said nozzle to introduce a fluid mixture to be separated, second conduit means communicating with said nozzle to introduce a solvent, a first outlet in the upper region of said vessel adjacent the second end thereof, a second outlet in the lower region of said vessel adjacent said second end, a plurality of baffles vertically disposed in the upper region of said vessel in spaced relationship with one another between said inelt and said first outlet, a mixer extending through each of said baffles to permit fluid flow therethrough, and a plurality of third conduit means communicating between said second conduit means and respective ones of said mixers to introduce solvent through said mixers in directions toward said first outlet.

8. The combination in accordance with claim 7 wherein said cooling means comprises a coil having a second inlet and a third outlet, fourth conduit means communicating with said second inlet to introduce a refrigerant, a first valve in said fourth conduit means, fifth conduit means communicating between said second inlet and said conduit means, a second valve in said fifth conduit means, means to compare the temperature at said second outlet with the temperature at said third outlet, and means responsive to said means to compare to close said first valve and to open said second valve when a predetermined temperature differential is detected.

References Cited in the file of this patent

UNITED STATES PATENTS

| | | |
|---|---|---|
| 1,680,353 | Werkenthin | Aug. 14, 1928 |
| 1,752,350 | Parker | Apr. 1, 1930 |
| 1,864,911 | Jodeck | Jan. 28, 1932 |
| 1,956,997 | Read | May 1, 1934 |
| 1,992,133 | Tarte | Feb. 19, 1935 |
| 2,077,057 | Poole | Apr. 13, 1937 |
| 2,088,497 | Tijmstra | July 27, 1937 |
| 2,091,645 | McConnell | Aug. 31, 1937 |
| 2,091,709 | Hampton | Aug. 31, 1937 |
| 2,142,525 | Noll | Jan. 3, 1939 |
| 2,184,838 | Hooker et al. | Dec. 26, 1939 |
| 2,312,112 | McNealey | Feb. 23, 1943 |
| 2,361,780 | Lewis | Oct. 31, 1944 |
| 2,451,433 | Davis | Oct. 12, 1948 |
| 2,468,044 | Davis | Apr. 26, 1949 |
| 2,726,192 | Kieras | Dec. 6, 1955 |
| 2,728,708 | Fenske | Dec. 27, 1955 |

UNITED STATES PATENT OFFICE
CERTIFICATE OF CORRECTION

Patent No. 2,900,308            August 18, 1959

Charles Matyear, Jr.

It is hereby certified that error appears in the printed specification of the above numbered patent requiring correction and that the said Letters Patent should read as corrected below.

Column 4, line 73, for "inelt" read -- inlet --; column 5, line 10, before "conduit", first occurrence, insert -- second --.

Signed and sealed this 23rd day of February 1960.

(SEAL)
Attest:

KARL H. AXLINE
Attesting Officer

ROBERT C. WATSON
Commissioner of Patents